United States Patent
Wen et al.

(10) Patent No.: US 11,979,419 B2
(45) Date of Patent: May 7, 2024

(54) INDUSTRIAL PROCESS SYSTEM THREAT DETECTION

(71) Applicant: Siemens Aktiengesellschaft, Munich (DE)

(72) Inventors: Chengtao Wen, Redwood City, CA (US); Mohamed El Amine Houyou, Jersey City, NJ (US); Juan L. Aparicio Ojea, Moraga, CA (US); Mathias Maurmaier, Gerlingen (DE); Martin Sehr, Kensington, CA (US); Tao Cui, Princeton Junction, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 288 days.

(21) Appl. No.: 17/442,901

(22) PCT Filed: Apr. 9, 2019

(86) PCT No.: PCT/US2019/026439
§ 371 (c)(1),
(2) Date: Sep. 24, 2021

(87) PCT Pub. No.: WO2020/209837
PCT Pub. Date: Oct. 15, 2020

(65) Prior Publication Data
US 2022/0201026 A1    Jun. 23, 2022

(51) Int. Cl.
*H04L 9/40* (2022.01)
*G05B 23/02* (2006.01)

(52) U.S. Cl.
CPC ...... *H04L 63/1425* (2013.01); *G05B 23/0272* (2013.01); *G05B 2223/06* (2018.08)

(58) Field of Classification Search
CPC ............ H04L 63/1425; G06B 23/0272; G06B 2223/06
(Continued)

(56) References Cited

U.S. PATENT DOCUMENTS

2006/0236374 A1 * 10/2006 Hartman ............. H04L 63/1416
726/3
2012/0198541 A1 * 8/2012 Reeves ............... H04L 63/1416
726/13
(Continued)

OTHER PUBLICATIONS

PCT International Search Report for corresponding PCT/US2019/026439 filed on Apr. 9, 2019; 14 pages.
(Continued)

*Primary Examiner* — Michael S McNally (57) ABSTRACT

Examples of techniques for threat detection in an industrial process system are described herein. An aspect includes determining a plurality of subsystems of an industrial process system. Another aspect includes, for each of the plurality of subsystems, constructing and training a respective deep autoencoder (DAE) model of the subsystem based on data corresponding to the industrial process system. Another aspect includes monitoring the industrial process system using the plurality of DAE models corresponding to the plurality of subsystems. Another aspect includes, based on the plurality of DAE models, determining a cyberattack in a subsystem of the plurality of subsystems.

17 Claims, 6 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2014/0283047 | A1* | 9/2014 | Dixit | H04L 63/1425 |
| | | | | 726/23 |
| 2014/0359708 | A1* | 12/2014 | Schwartz | G06F 15/173 |
| | | | | 726/4 |
| 2016/0261482 | A1* | 9/2016 | Mixer | H04L 43/12 |
| 2018/0159879 | A1* | 6/2018 | Mestha | G06N 3/084 |
| 2018/0300319 | A1* | 10/2018 | Burriesci | G06F 16/783 |

OTHER PUBLICATIONS

Muna Al-Hawawreh et al: "Identification of malicious activities in industrial internet of things based on deep learning models", Journal of Information Security and Applications, vol. 41, Aug. 1, 2018 (Aug. 1, 2018), pp. 1-11, XP55605100 / Aug. 1, 2018.

* cited by examiner

INDUSTRIAL PROCESS SYSTEM THREAT DETECTION

This application is a national phase filing under 35 U.S.C. § 371 of International Patent Application No. PCT/US2019/026439, filed Apr. 9, 2019, which is incorporated herein by reference in its entirety.

BACKGROUND

The present techniques relate to threat detection in a network. More specifically, the techniques relate to threat detection in an industrial process system that is connected to a network.

An industrial process system may be connected to a network, such as the Internet. For example, modification and optimization of an industrial process system during operation may be performed using real-time field data from a connected industrial system. However, security in an existing industrial process system may have been designed assuming that the industrial process system was not going to be connected to a network. Such security may depend on the physical isolation of the industrial process system, which prevents attackers from reaching the industrial process system. Elements, such as sensors or controllers, in an industrial process system may not require authentication from devices attempting to access the elements or alter the state of the elements. Such industrial process systems also may not support encrypted communication. Therefore, anyone who has network access may have unrestricted access to the elements of the industrial process system, which may allow sabotage of the industrial process system.

SUMMARY

According to an embodiment described herein, a system can include a processor to determine a plurality of subsystems of an industrial process system. The processor can also, for each of the plurality of subsystems, construct and train a respective deep autoencoder (DAE) model of the subsystem based on data corresponding to the industrial process system. The processor can also monitor the industrial process system using the plurality of DAE models corresponding to the plurality of subsystems. The processor can also, based on the plurality of DAE models, determining a cyberattack in a subsystem of the plurality of subsystems.

According to another embodiment described herein, a method can include determining, by a processor, a plurality of subsystems of an industrial process system. The method can also include, for each of the plurality of subsystems, constructing and training a respective deep autoencoder (DAE) model of the subsystem based data corresponding to the industrial process system. The method can also include monitoring the industrial process system using the plurality of DAE models corresponding to the plurality of subsystems. The method can also include, based on the plurality of DAE models, determining a cyberattack in a subsystem of the plurality of subsystems.

According to another embodiment described herein, a computer program product can include a computer readable storage medium having program instructions embodied therewith, the program instructions executable by a processing device to cause the processing device to perform a method including determining a plurality of subsystems of an industrial process system. The method can also include, for each of the plurality of subsystems, constructing and training a respective deep autoencoder (DAE) model of the subsystem based on data corresponding to the industrial process system. The method can also include monitoring the industrial process system using the plurality of DAE models corresponding to the plurality of subsystems. The method can also include, based on the plurality of DAE models, determining a cyberattack in a subsystem of the plurality of subsystems.

DETAILED DESCRIPTION

Embodiments of threat detection in an industrial process system are provided, with exemplary embodiments being discussed below in detail. When a previously isolated industrial process system is connected to a network, such as the Internet, the industrial process system may be exposed to threats, such as cyberattacks, through vulnerabilities in the software and hardware technologies of the industrial process system, as well as through vulnerabilities in industrial control system (ICS) networks of the industrial process system. Example consequences of a cyberattack on an industrial process system may include material damage, bodily harm, loss of profits, loss of confidential data, and environmental impact. Examples of an industrial process system that may be connected to a network include but are not limited to a manufacturing system or a power generation system.

Identification of anomalies in real-time data from the operation of an industrial process system may be used to detect cyberattacks, as anomalous data that deviates significantly from normal data may indicate the presence of a cyberattack. Anomalies may be detected based on distance-based and density-based approaches. A distance-based approach may determine an anomaly based on data that is relatively far from most other instances in the dataset, and a density-based approach may determine an anomaly if the density of data is relatively small as compared to an average density of its neighboring instances. Approaches to monitoring and analyzing the behavior of an industrial process system for anomalies may be classified into information technology (IT) systems that are focused on data-centric computing, and operational technology (OT) systems that monitor events, processes, and devices, while making adjustments in enterprise and industrial operations. An IT monitoring system may detect anomalous data in, for example, network traffic and/or loads of computational nodes in an industrial process system. OT-based anomaly detection may be performed based on a mathematical model of the industrial process system. Dependencies between different measurable signals in the industrial process system may be used to detect faults in, e.g., processes, actuators, and sensors of the industrial process system using the model. These dependencies may be expressed explicitly or implicitly in the model of the industrial process system. An OT-oriented physics model may be used to determine a set of process variables, including but not limited to sensor data, for an industrial process system, and an IT-oriented data analysis model may be built based on the selected process variables from the OT-oriented model. The IT-oriented model may then be used to monitor the industrial process system for anomalies. Unsupervised learning technology may be used to detect anomalies in time-series data via lower dimensional embedding of the real-time field data. In the low-dimensional space, cyberattacks and normal operations may be separated from each other. After finding separable low-dimensional embeddings, normal and abnormal operation data may be mapped back to the original data space by reconstructing the original data. The reconstruction error of a data point, which is the error between the original data point and its reconstruction from its low-dimensional representation, may be used to detect anomalies.

A deep autoencoder (DAE) model of an industrial process system may be used for real-time anomaly detection based on reconstruction error. A DAE model may include an artificial neural network that encodes high-dimensional input data into a lower-dimensional space, and then reconstructs the lower-dimensional data. Normal operational data may be fed into a DAE model, which learns to compress the high-dimensional input data x into a short code as low-dimensional embedding. The DAE model then reconstructs the short code into reconstructed data X. The difference, or error, between the input data and the reconstructed data may be used to detect anomalies in the industrial process system. Industrial process system data showing a cyberattack may be difficult to obtain. For a DAE model that is trained using representative process data that does not include any cyberattacks, the resulting trained DAE model may capture the nature of the industrial process system under normal operations. Therefore, the reconstruction error $\varepsilon=(x-\hat{X})^2$ may be relatively small for normal operations without cyberattacks. However, an ICS network under cyberattack may generate process data with features that were not seen under normal operation, and thus not encoded in the DAE model. Data that includes a cyberattack may cause relatively large reconstruction errors to be generated by the trained DAE model.

The input data that is provided to a DAE model may include critical states of both OT and IT devices in the industrial process system. For OT devices, critical states may include physical variables, e.g., a liquid level in a tank that must not overflow, or a rotational speed of an element that should not exceed safety limits. To maintain safe operation of the industrial process system, a cyberattack must be prevented from driving any of these critical states outside of the safe operational range. Critical states may be determined by analyzing process models. For example, sensitivity analysis of physical models may determine which attacks are most likely to affect overall system behavior. Following a sensitivity analysis, values of critical inputs can be refined, while parameters that have little effect may be simplified or ignored. For example, for an industrial process system element comprising a distillation column, the temperature and compositions of sensitive plates may be input to a DAE model. A DAE model input may also include critical states of IT devices, e.g., network traffic, node loads, available memory, and alarms. Interconnections between the critical states of IT and OT devices are represented by the DAE model.

The efficiency of a DAE model may be low with a high-dimensional input x (i.e., having a relatively large number of input data variables) from a relatively large and complex industrial process system. Therefore, an industrial process system may be divided into subsystems, and a respective DAE model may be constructed for each subsystem. The division into subsystems may be performed based on a node graph of the industrial process system, which may be based on, for example, open platform communications unified architecture (OPC UA) graphs and/or piping and instrumentation diagrams (P&ID) of the industrial process system. OPC UA is an interoperability standard for exchange of data regarding elements, and relationships between elements, in an industrial process system. The elements in a node graph may include both IT and OT elements in the industrial process system. OPC UA may include address space modeling to transfer information in a unique and transparent manner, and information modeling to define information in an unambiguous, computer-centric definition manner.

UPC UA graph may assign an address to a plurality of elements in the industrial process system. The collection of these elements defines the address space. Atomic addressable elements in the address space may be referred to as nodes. Nodes are interconnected by reference as addressholders of coupled nodes. Address space modeling may be used instantiate the nodes and interconnections. Information modeling represents the behaviors of the industrial process system using a set of predefined type definitions. Type definitions provide a description of the address space structure and allow clients to use this knowledge to navigate to desired information in the address space. Using OPC UA, an industrial process system may be represented abstractly as a graph. The graph nodes are instantiated from a number of predefined node types (e.g. variable, object, method), and the graph edges are instantiated from the references, which defines typed and directed relations between nodes. Decomposition of the industrial process system may be performed by partitioning the nodes of the node graph into a set of non-overlapping subsystems. Subsystems may be determined by dividing the graph into groups, or clusters, of nodes with dense connections internally, and sparser connections between subsystems; each cluster may correspond to a respective subsystem. Construction and training of a plurality of DAE models, each of the DAE models corresponding to a respective subsystem of the industrial process system, may allow relatively efficient detection of cyberattacks in the industrial process system.

Embodiments of industrial process system threat detection may detect various types of cyberattacks, including but not limited to denial of service, sign alternation, rerouting, reply false data injection and bias injection attack. A denial of service (DoS) attack may include blocking of signals from sensors and/or actuators from reaching their destination by gaining unauthorized access to the industrial process system, leading to physical damage to devices. A DoS attack may include overflowing communication networks with large amounts of traffic or jamming networks. A sign alternation attack may include flipping a sign (e.g., positive to negative) of a measurement or control signal in the industrial process system in order to destabilize the industrial process system. A rerouting attack may include permuting the values of measurement or control signals by physically re-wiring sensor cables or by modifying, for example, a sender address. A reply false data injection attack may include controlling sensor measurements at steady state, while sending malicious control signals to actuators in the industrial process system (e.g., Stuxnet malware). A bias injection attack may include injecting a constant or time-varying bias into signals in the industrial process system.

Figure 1:
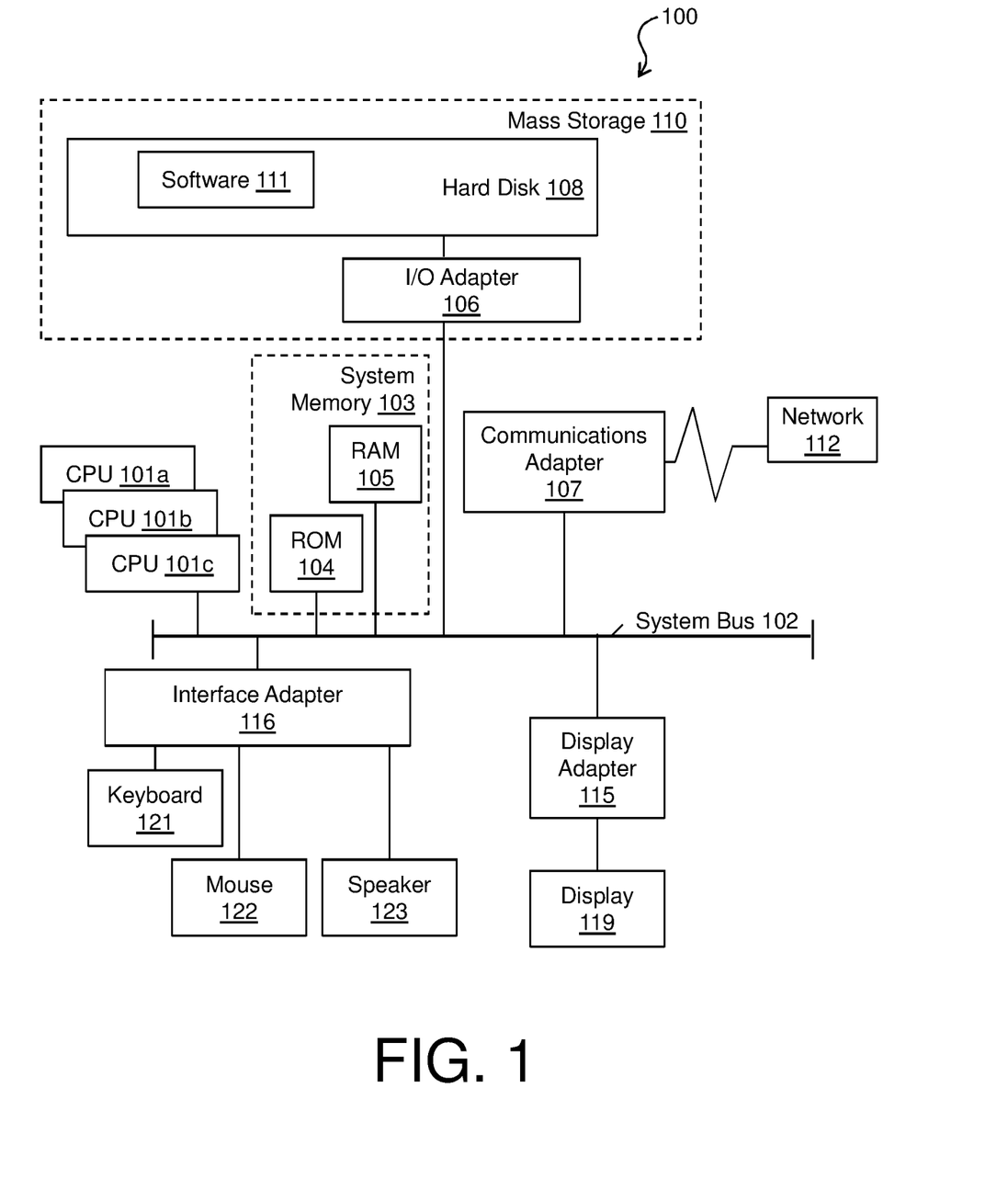
FIG. 1 is a block diagram of an example computer system for use in conjunction with threat detection in an industrial process system.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RANI is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
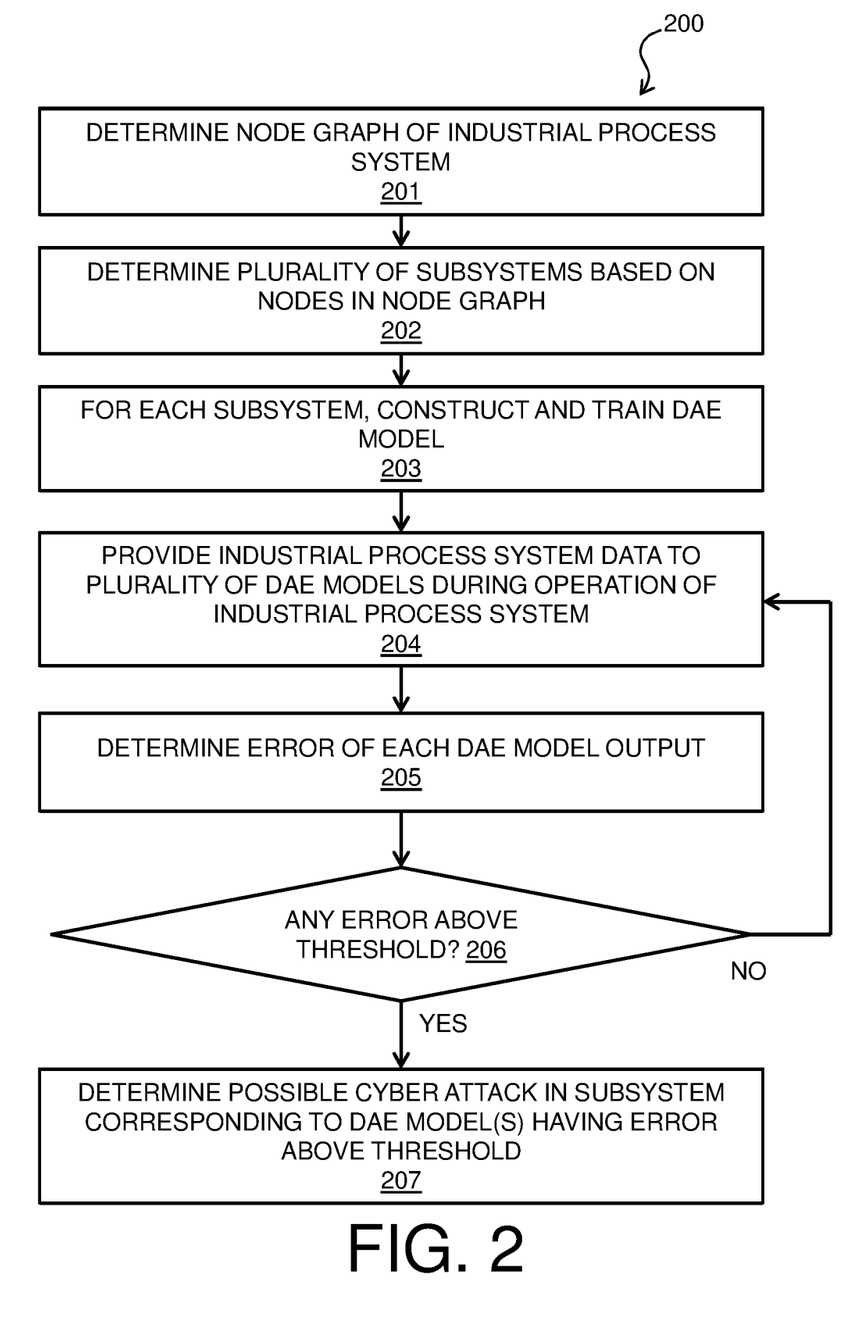
FIG. 2 is a process flow diagram of an example method for threat detection in an industrial process system.

FIG. 2 is a process flow diagram of an example method for threat detection in an industrial process system. The method 200 can be implemented with any suitable computing device, such as the computer system 100 of FIG. 1. In block 201, a node graph of an industrial process system, such as a manufacturing system or a power generation system, is determined. The node graph may be generated based on an OPC UA graph and/or P&ID data regarding the industrial process system in some embodiments. The node graph may include a plurality of nodes. Each node may correspond to a respective IT or OT element of the industrial process system. IT elements may include but are not limited to computer processing devices, which may correspond to a computer such as computer system 100 in some embodiments. OT elements may include but are not limited to valves, sensors, and actuators. The node graph may further include a plurality of connections defining relationships between the various nodes (e.g., an actuator that is controlled based on a sensor output via a computer processing device). An element in the industrial process system may correspond to a single respective node or multiple nodes in the node graph of the industrial process system.

Figure 4:
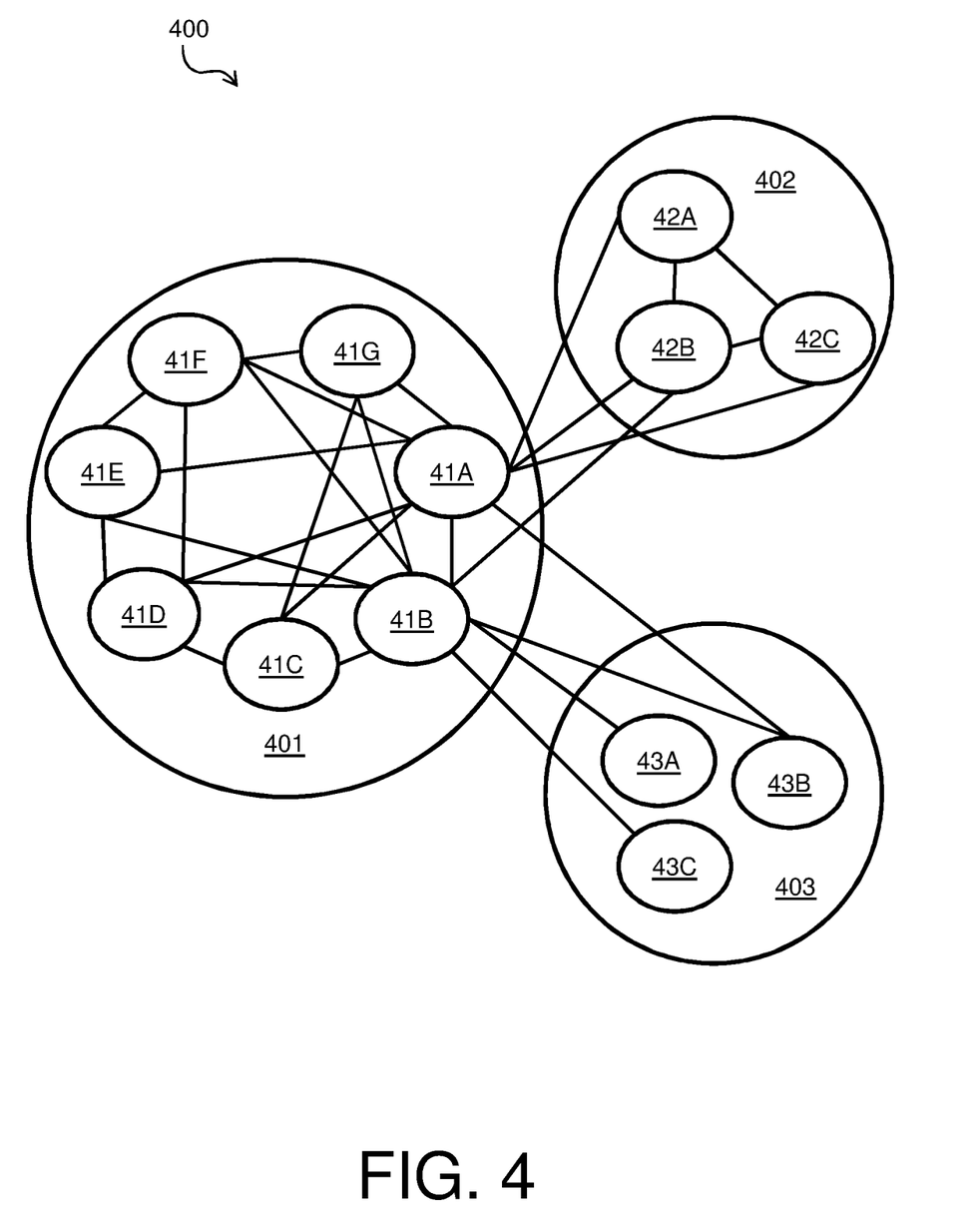
FIG. 4 is a block diagram of an example open platform communications unified architecture (OPC UA) graph of an industrial process system for use in conjunction with threat detection in an industrial process system.

In block 202, clusters of nodes are determined based on the node graph that was generated in block 201, and subsystems of the overall industrial process system are identified based on the clusters of nodes. The clusters may be determined in any appropriate manner, and each determined cluster may correspond to a single respective subsystem. In some embodiments, the clusters may be determined by graph decomposition, such that the nodes within each subsystem have relatively dense connections within their respective cluster, and relatively sparse connections between nodes in different subsystems. Each node of the industrial process system may belong to a single subsystem. An example cluster graph such as is generated in block 202 of FIG. 2 is shown in FIG. 4, which is discussed in further detail below.

Figure 5:
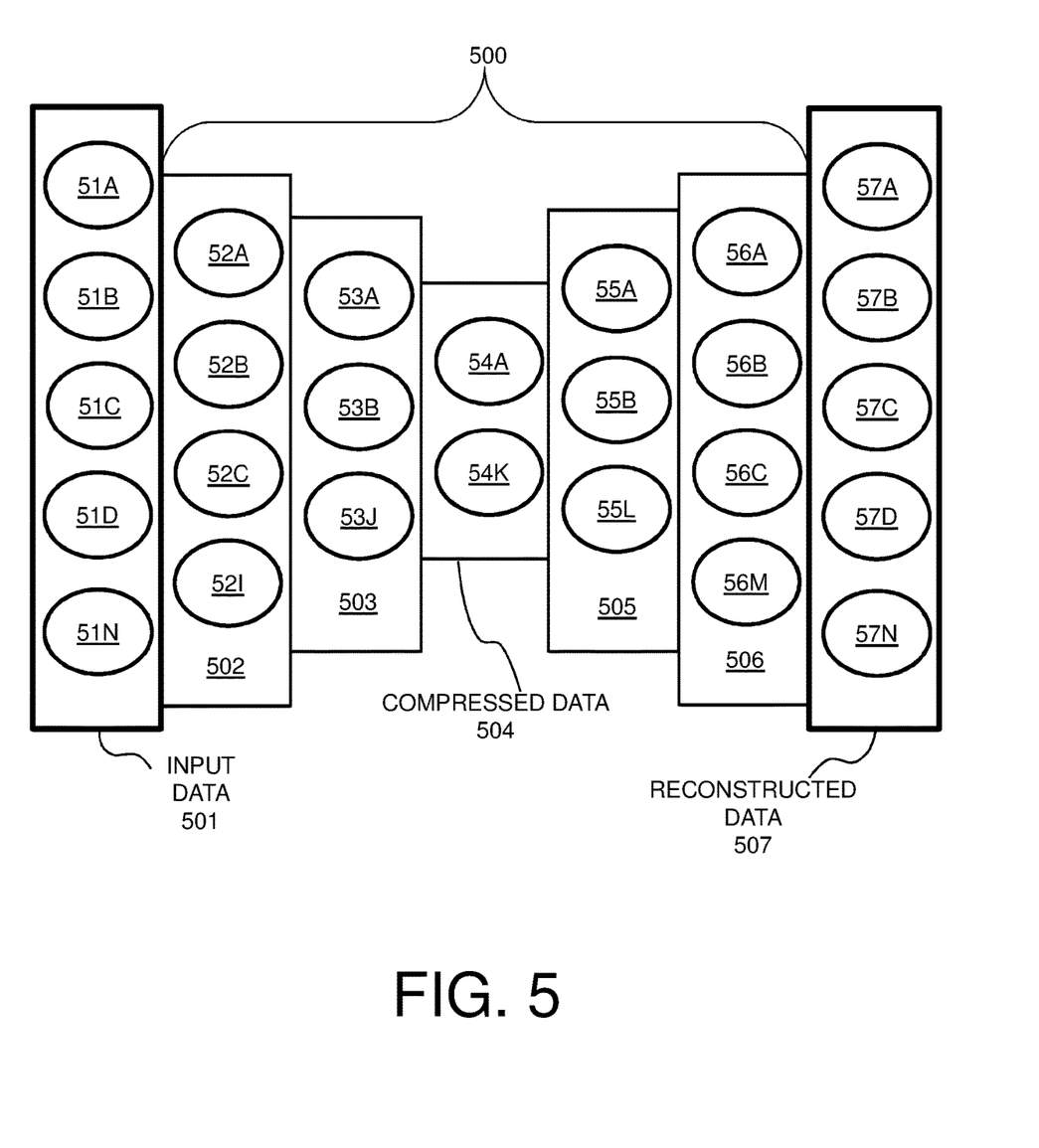
FIG. 5 is a block diagram of an example deep autoencoder (DAE) model for use in conjunction with threat detection in an industrial process system.

In block 203, for each subsystem that was identified in block 202, a DAE model is constructed and trained based on steady-state data from the industrial process system. The input data of a DAE model for a subsystem is determined based on the nodes that are in the subsystem's corresponding cluster in the node graph. The training data that is used in block 203 to train the plurality of DAE models may, in various embodiments, be collected from the industrial process itself, or from a simulation of the industrial process. Embodiments that train the DAE models using simulation data may gather the simulation data from a high-fidelity simulation of the industrial process system. An example DAE model such as is constructed and trained in block 203 of FIG. 2 is shown in FIG. 5, which is discussed in further detail below.

In block 204, each of the plurality of DAE models that were constructed and trained in block 203 is used to monitor for anomalies in the industrial process system during operation of the industrial process system. Input data from real-time operation of the industrial process system is fed into each of the DAE models. Each of the DAE models receives input data corresponding to the DAE model's respective subsystem. In block 205, an error in the reconstructed data that is output by each of the DAE models is determined. In block 206, it is determined if any of the DAE models has an error that is higher than a threshold. The threshold may be determined in any appropriate manner. If it is determined in block 206 that none of the DAE models have an error that is higher than the threshold, flow proceeds from block 206 back to block 204, and monitoring for anomalies in the industrial process system using the plurality of DAE models continues according to blocks 204, 205, and 206. If it is determined in block 206 that any of the DAE models has an error that is higher than the threshold, flow proceeds from block 206 to block 207. In block 207, based on the error being above the threshold, it is determined that there is an anomaly, which may correspond to a cyberattack, in the one or more subsystems corresponding to the one or more DAE models that were determined to have an error higher than the threshold in block 206. A type of the cyberattack may also be identified based on the input data from the operation of the industrial process system in block 207 in some embodiments; this is discussed in further detail below with respect to FIG. 6. Blocks 204, 205, and 206 are performed repeatedly during operation of the industrial process system to detect any anomalies as described in block 207.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
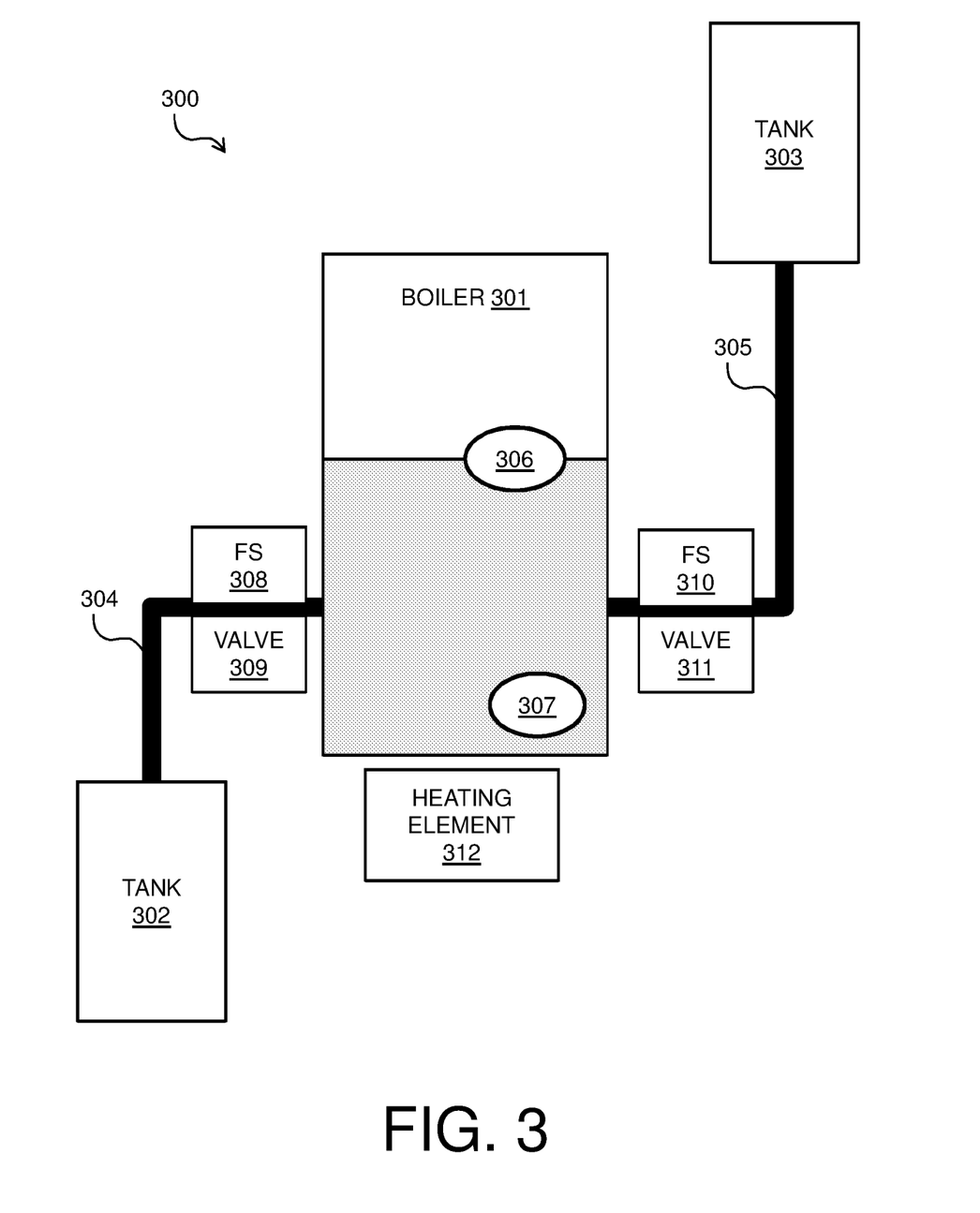
FIG. 3 is a block diagram of an example industrial process system for use in conjunction with threat detection in an industrial process system.

FIG. 3 is a block diagram of an example industrial process system 300 for use in conjunction with threat detection in an industrial process system. The example system 300 includes a boiler 301 that is connected to two tanks 302 and 303 via pipes 304 and 305, respectively. Boiler 301 includes a level sensor 306 and a temperature sensor 307. An inlet flow sensor 310 controls a constant inlet flow rate from tank 303 into the boiler 301 via valve 311 and pipe 305. An outlet flow sensor 308 located between the boiler 301 and tank 302 controls the water level in the boiler 301 within a specific range, i.e. $[L_{min}, L_{max}]$, via valve 309 and pipe 304 based on level sensor 306. An alarm may be triggered if the measurement $L_{water}$ output by level sensor 306 is outside of the range $[L_{min}, L_{max}]$. A firing rate of heating element 312 is controlled based on temperature sensor 307 to maintain the temperature T of the boiler 301 within a specified temperature range $[T_{min}, T_{max}]$. The example system 300 may include various computer processing devices that control elements of the system 300 based on sensor outputs; in some embodiments, the computer processing devices may be embedded in a controlled element (e.g., valve 309, valve 311, heating element 312).

System 300 of FIG. 3 is shown for illustrative purposes only. It is to be understood that the block diagram of FIG. 3 is not intended to indicate that the system 300 is to include all of the components shown in FIG. 3. Rather, the system 300 can include any appropriate fewer or additional components not illustrated in FIG. 3 (e.g., additional boilers, tanks, pipes, sensors, valves, connections, any other IT or OT elements, etc.). Further, the embodiments described herein with respect to system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 4 is a block diagram of an example node graph 400 of an industrial process system, such as system 300 of FIG. 3, for use in conjunction with threat detection in an industrial process system. Node graph 400 may be constructed in blocks 201 and 202 of method 200 of FIG. 2. Node graph 400 may be implemented in conjunction with any suitable computing device, such as the computer system 100 of FIG. 1. Node graph 400 includes a plurality of nodes 41A-G, 42A-C, and 43A-C that are divided into clusters 401, 402, and 403. Cluster 401 comprises a first subsystem of the industrial process system, and includes nodes 41A-G. Nodes 41A-B in cluster 401 are directly connected to nodes in clusters 402 and 403, while the remaining nodes 41C-G are only directly connected to nodes within cluster 401. Cluster 402, corresponding to a second subsystem of the industrial process system, includes nodes 42A-C. Cluster 403, corresponding to a third subsystem of the industrial process system, includes nodes 43A-C. Each node of nodes 41A-G, 42A-C, and 43A-C may correspond to a respective IT or OT element of the industrial process system (for example, a computer processing device, a valve, a sensor, or an actuator). For an IT element comprising a computer processing device that is embedded in an OT element, the IT element and the OT element may have separate nodes in the node graph 400. In some embodiments, the nodes and connections between the nodes, as shown in FIG. 4, may be determined based on OPC UA and/or P&ID data regarding the industrial process system, such as system 300 of FIG. 3. In the example illustrated in FIG. 4, cluster 401 may correspond to a boiler subsystem, including elements corresponding to boiler 301 of system 300 of FIG. 3; cluster 402 may correspond to a first tank subsystem, including elements corresponding to tank 302 of system 300 of FIG. 3, and cluster 403 may correspond to a second tank subsystem, including elements corresponding to tank 303 of system 300 of FIG. 3.

In some embodiments, spectral clustering may be used to determine the clusters (e.g., clusters 401, 402, and 403) in the node graph 400. A graph cut (e.g., a bisection of a graph) may be calculated by defining a graph Laplacian, finding the significant eigenvector of the Laplacian, and thresholding the eigenvector. Nodes corresponding to elements of the eigenvector above the threshold may belong to a first partition of the graph, and nodes below the threshold belong to a second partition of the graph. Spectral clustering may be used to create any appropriate number partitions, or clusters, of nodes in the graph. The k most significant eigenvectors of the graph Laplacian may be found, the data points in the space spanned by these eigenvectors may be embedded, and the final clusters may be determined via k-means in some embodiments.

FIG. 4 is shown for illustrative purposes only. For example, a node graph such as is shown in FIG. 4 may include any appropriate number of nodes, and the nodes may each be of any appropriate type. The node graph such as is shown in FIG. 4 may include any appropriate number of clusters corresponding to subsystems, and each of the clusters may include any appropriate number of nodes. Further, the various nodes of a node graph such as is shown in FIG. 4 may be interconnected in any appropriate manner.

FIG. 5 is a block diagram of a DAE model 500 for threat detection in an industrial process system. Model 500 may be constructed and trained in block 203 of method 200 of FIG. 2. Model 500 may be implemented in conjunction with any suitable computing device, such as the computer system 100 of FIG. 1. Model 500 includes first level compression 502, second level compression 503, compressed data 504, first level reconstruction 505, and second level reconstruction 506. Input data 501 comprising elements 51A-N is input into the model 500, and the output from the model 500 is reconstructed data 507. Elements 51A-N in input data 501 may each correspond to a respective node in a subsystem of an industrial process system, such as nodes 41A-G of cluster 401 of FIG. 4. The data in input data 501 may be gathered from the industrial process system, or from a simulation of the industrial process system, in various embodiments. The input data 501 is compressed via first level compression 502 (comprising elements 52A-I) and second level compression 503 (comprising elements 53A-J) into compressed data 504, comprising elements 54A-K. The compressed data 504 is then reconstructed via first level reconstruction 505 (comprising elements 55A-L) and second level reconstruction 506 (comprising elements 56A-M) to give the output of model 500 comprising reconstructed data 507, comprising elements 57A-N. The input data 501 and reconstructed data 507 may each have the same number of elements N in some embodiments. The first level compression 502 and the second level reconstruction 506 may each have the same or different number of elements (I and M) in various embodiments. The second level compression 503 and the first level reconstruction 505 may each have the same or different number of elements (J and L) in various embodiments. In various embodiments, N may be greater than I; I may be greater than J; and J may be greater than K (i.e., a number of elements in the compressed data 504). In various embodiments, K may be less than L; L may be less than M; and M may be less than N. A difference, or error, between the input data 501 and the reconstructed data 507 may be used to detect anomalies in a subsystem of an industrial process system that corresponds to the DAE model 500.

For the example system 300 that was shown in FIG. 3, which includes three subsystems each having a respective DAE model, the input data 501 to the DAE model 500 corresponding to the boiler subsystem (e.g., corresponding to cluster 401 of FIG. 4) may be represented as $x=[F_{in}, F_{out}, L_{water}, \hat{L}_{water}, T_{boiler}, L_{traffic}, L_{controller}]$. The input data includes a plurality of OT device variables $[F_{in}, F_{out}, L_{water}, \hat{L}_{water}, T_{boiler}]$. $F_{in}$ is an inlet flow rate, $F_{out}$ is an outflow rate, $L_{water}$ is the boiler water level, $\hat{L}_{water}$ is a level estimator, which can estimate the water level from mass balance, and $T_{boiler}$ the boiler water temperature. The input data also includes two IT device variables $[L_{traffic}, L_{controller}]$. $L_{traffic}$ is the network traffic from the boiler level node, and $L_{controller}$ is the computational load of the boiler firing rate control loop, e.g. a percentage of CPU usage. The DAE model may be constructed and trained in block 203 of FIG. 2 based on data that was gathered during normal operations of the example system 300, or based on data gathered from a high-fidelity simulation of the example system 300. The trained DAE model 500 may be used in blocks 204-207 of FIG. 2 to detect any cyberattacks in the boiler subsystem of the example system 300.

FIG. 5 is shown for illustrative purposes only. For example, a DAE model such as is shown in FIG. 5 may have any appropriate number of levels of compression and levels of reconstruction, each level having any appropriate number of elements. Further, a DAE model such as is shown in FIG. 5 may receive input data including any appropriate number and type of data elements, and may output a reconstructed data including any appropriate number of data elements.

Figure 6:
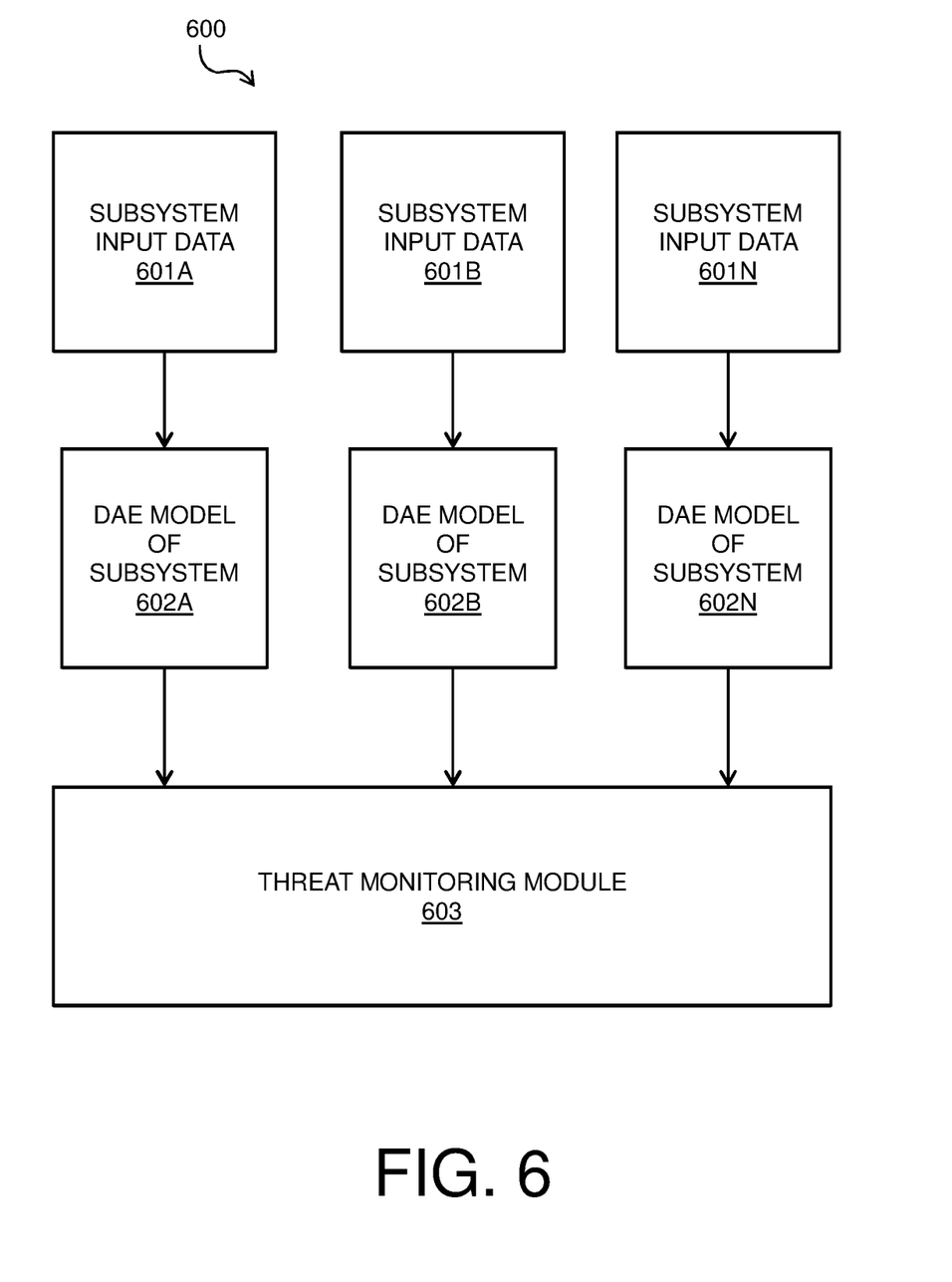
FIG. 6 is a block diagram of an example system for threat detection in an industrial process system.

FIG. 6 is a block diagram of an example system 600 for threat detection in an industrial process system. System 600 may be implemented in conjunction with any suitable computing device, such as the computer system 100 of FIG. 1. System 600 may be constructed according to blocks 201, 202, and 203 of method 200 of FIG. 2, and may operate according to blocks 204, 205, 206, and 207 of method 200 of FIG. 2. System 600 receives a plurality of instances of subsystem input data 601A-N comprising real-time operational data from an industrial process system. Each subsystem input data 601A-N may correspond to respective input data such as input data 501 of FIG. 5. Each subsystem input data 601A-N is determined based on the nodes in a cluster corresponding to the subsystem in a node graph such as is shown in FIG. 4. Each subsystem input data of subsystem input data 601A-N is fed into a respective DAE model of DAE models 602A-N corresponding to the same subsystem. The threat monitoring module 603 determines an error based on comparing each instance of subsystem input data 601A-N to its respective reconstructed data (e.g., reconstructed data 507) for each of the DAE models 602A-N, as described above with respect to block 204 of FIG. 2. Based on the determined errors, the threat monitoring module 603 determines if there is a potential cyberattack in any subsystem of the industrial process, as described above with respect to blocks 205, 206, and 207 of FIG. 2. In some embodiments, a type of the cyberattack may also be determined in block 207 of FIG. 2 based on the subsystem input data 601A-N corresponding to the potential cyberattack.

For the boiler subsystem of the example system 300 of FIG. 3, the industrial process system may reach a steady state (i.e., $F_{in}=F_{out}$, $T_{boiler}$=constant). Various types of cyberattacks may be identified by threat monitoring module 603 during operation of the system 300 based on the DAE model of the boiler subsystem (e.g., DAE model 602A). For an example DoS attack, the attacker may block the signals of both flow sensors, e.g. $F_{in}$=NaN (Not-a-Number) and $F_{out}$=NaN. $\hat{L}_{water}$=NaN will be an anomaly, which will not be reconstructed in the output data from the DAE model 602A. For an example sign alternation attack, the attacker may flip the sign of the water level control. The higher water level may trigger a reduced outlet flow rate. The boiler water level may reach the upper bound and stay there, i.e. $L_{water}=L_{max}$. Network traffic may increase and stay at a high value because of the level alarms that are triggered by the high water level. $L_{traffic}$ may therefore be an anomaly, which will not be reconstructed properly by the DAE model 602A. For an example rerouting attack, the attacker may switch the values of the inlet and outlet flow sensors. The boiler water level may reach the upper bound and stay there, i.e. $L_{water}=L_{max}$. Network traffic may increase and stay at a high value because the triggered level alarms are triggered. $L_{traffic}$ is an anomaly, which will not be reconstructed properly by the DAE model 602A. For an example reply false data injection attack, the attacker may keep steady level sensor measurements under control while sending malicious control signals to the outlet flow valve, i.e. valve 309 of FIG. 3. This will cause a significant difference between $L_{water}$ and $\hat{L}_{water}$, which gives an anomaly that will not be reconstructed properly by the DAE model 602A. For a bias injection attack, the attacker may inject a time-varying bias in the inlet and outlet flow signals, i.e. $F_{in}=F_{out}$=wrong value. The boiler temperature will keep increasing or decreasing. This triggers a firing rate control, which is computationally intensive. Therefore, the CPU usage of the firing rate controller node will increase and stay at high value. $L_{controller}$ will be an outlier, which will not be reconstructed properly by the DAE model 602A.

It is to be understood that the block diagram of FIG. 6 is not intended to indicate that the system 600 is to include all of the components shown in FIG. 6. Rather, the system 600 can include any appropriate fewer or additional components not illustrated in FIG. 6 (e.g., additional computer systems, processors, memory components, embedded controllers, modules, computer networks, network interfaces, data inputs, etc.). Further, the embodiments described herein with respect to system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, apparatus, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, apparatus, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
    determine a plurality of subsystems of an industrial process system;
    for each of the plurality of subsystems, construct and train a respective deep autoencoder (DAE) model of the subsystem based on data corresponding to the industrial process system;
    monitor the industrial process system uning the plurality of DAE models corresponding to the plurality of subsystems; and
    based on the plurality of DAE models, determine a cyberattack in a subsystem of the plurality of subsystems,
    wherein determining the plurality of subsystems of the industrial process system comprises:
    determining a node graph of the industrial process system, the node graph comprising a plurality of nodes, each of the plurality of nodes corresponding to a respective element of the industrial process system;
    determining a plurality of node clusters in the node graph, wherein each node cluster of the plurality of node clusters comprises a respective subset of the plurality of nodes, and wherein each node cluster of the plurality of node clusters corresponds to a respective subsystem of the industrial process system.

2. The system of claim 1, wherein the plurality of nodes corresponds to information technology (IT) elements and operational technology (OT) elements of the industrial process system.

3. The system of claim 1, wherein a DAE model of the plurality of DAE models is constructed based on elements of the industrial process system that correspond to the subset of the plurality of nodes in the node cluster that corresponds to the DAE model.

4. The system of claim 3, wherein the DAE model receives input data corresponding to each of the elements that correspond to the subset of the plurality of nodes during the monitoring of the industrial process system.

5. The system of claim 1, wherein determining the cyberattack in the subsystem comprises:
    determining an error between input data of the DAE model corresponding to the subsystem and output data of the DAE model corresponding to the subsystem;
    determining whether the error is above a threshold; and
    based on the error being above the threshold, determining the cyberattack in the subsystem.

6. The system of claim 1, further comprising identifying a type of the determined cyberattack based on the monitoring of the industrial process system.

7. A computer-implemented method, comprising:
- determining, by a processor, a plurality of subsystems of an industrial process system;
- for each of the plurality of subsystems, constructing and training, by the processor, a respective deep autoencoder (DAE) model of the subsystem based on data corresponding to the industrial process system;
- monitoring the industrial process system using the plurality of DAE models corresponding to the plurality of subsystems; and
- based on the plurality of DAE models, determine a cyberattack in a subsystem of the plurality of subsystems,
- wherein determining the plurality of subsystems of the industrial process system comprises:
- determining a node graph of the industrial process system, the node graph comprising a plurality of nodes, each of the plurality of nodes corresponding to a respective element of the industrial process system;
- determining a plurality of node clusters in node graph, wherein each node cluster of the plurality of node clusters comprises a respective subset of the plurality of nodes, and wherein each node cluster of the plurality of node clusters corresponds to a respective subsystem of the industrial process system.

8. The computer-implemented method of claim 7, wherein the plurality of nodes corresponds to information technology (IT) elements and operational technology (OT) elements of the industrial process system.

9. The computer-implemented method of claim 7, wherein a DAE model of the plurality of DAE models is constructed based on elements of the industrial process system that correspond to the subset of the plurality of nodes in the node cluster that corresponds to the DAE model.

10. The computer-implemented method of claim 9, wherein the DAE model receives input data corresponding to each of the elements that correspond to the subset of the plurality of nodes during the monitoring of the industrial process system.

11. The computer-implemented method of claim 7, wherein determining the cyberattack in the subsystem comprises:
- determining an error between input data of the DAE model corresponding to the subsystem and output data of the DAE model corresponding to the subsystem;
- determining whether the error is above a threshold; and
- based on the error being above the threshold, determining the cyberattack in the subsystem.

12. The computer-implemented method of claim 7, further comprising identifying a type of the determined cyberattack based on the monitoring of the industrial process system.

13. A computer program product comprising:
- a computer readable storage medium having program instructions embodied therewith, the program instructions executable by a processinh device to cause the processing device to perform a method comprising:
- determining a plurality of subsystems of an industrial process system;
- for each of the plurality of subsystems, constructing and training a respective deep autoencoder (DAE) model of the subsystem based on data corresponding to the industrial process system;
- monitoring the industrial process system using the plurality of DAE models corresponding to the plurality of subsystems; and
- based on the plurality of DAE models, determine a cyberattack in a subsystem of the plurality of subsystems,
- wherein determining the plurality of subsystems of the industrial process system comprises:
- determining a node graph of the industrial process system, the node graph comprising a plurality of nodes, each of the plurality of nodes corresponding to a respective element of the industrial process system;
- determining a plurality of node clusters in the node graph, wherein each node cluster of the plurality of node clusters comprises a respective subset of the plurality of nodes, and wherein each node cluster of the plurality of node clusters corresponds to a respective subsystem of the industrial process system.

14. The computer program product of claim 13, wherein the plurality of nodes corresponds to information technology (IT) elements and operational technology (OT) elements of the industrial process system.

15. The computer program product of claim 13, wherein a DAE model of the plurality of DAE models is constructed based on elements of the industrial process system that correspond to the subset of the plurality of nodes in the node cluster that corresponds to the DAE model.

16. The computer program product of claim 15, wherein the DAE model receives input data corresponding to each of the elements that correspond to the subset of the plurality of nodes during the monitoring of the industrial process system.

17. The computer program product of claim 13, wherein determining the cyberattack in the subsystem comprises:
- determining an error between input data of the DAE model corresponding to the subsystem and output data of the DAE model corresponding to the subsystem;
- determining whether the error is above a threshold; and
- based on the error being above the threshold, determining the cyberattack in the subsystem.

* * * * *